United States Patent
Raisch et al.

(10) Patent No.: US 11,762,659 B2
(45) Date of Patent: Sep. 19, 2023

(54) HANDLING AN INPUT/OUTPUT STORE INSTRUCTION

(71) Applicant: INTERNATIONAL BUSINESS MACHINES CORPORATION, Armonk, NY (US)

(72) Inventors: Christoph Raisch, Gerlingen (DE); Marco Kraemer, Sindelfingen (DE); Frank Siegfried Lehnert, Weil im Schoenbuch (DE); Matthias Klein, Poughkeepsie, NY (US); Jonathan D. Bradbury, Poughkeepsie, NY (US); Christian Jacobi, West Park, NY (US); Brenton Belmar, New Paltz, NY (US); Peter Dana Driever, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/480,337

(22) Filed: Sep. 21, 2021

(65) Prior Publication Data
US 2022/0004387 A1    Jan. 6, 2022

Related U.S. Application Data

(63) Continuation of application No. 16/775,663, filed on Jan. 29, 2020, now Pat. No. 11,163,566.

(30) Foreign Application Priority Data

Jan. 31, 2019    (EP) .................................... 19154733

(51) Int. Cl.
*G06F 9/30*    (2018.01)
*G06F 9/451*   (2018.01)
(Continued)

(52) U.S. Cl.
CPC ...... *G06F 9/30043* (2013.01); *G06F 9/30145* (2013.01); *G06F 9/3871* (2013.01);
(Continued)

(58) Field of Classification Search
None
See application file for complete search history.

(56) References Cited

U.S. PATENT DOCUMENTS

| 4,040,028 | A | 8/1977 | Pauker et al. |
| 4,947,316 | A | 8/1990 | Fisk et al. |

(Continued)

FOREIGN PATENT DOCUMENTS

| CN | 105912489 A | 8/2016 |
| EP | 0389046 A2 | 9/1990 |

(Continued)

OTHER PUBLICATIONS

'RDMA enabled NIC (RNIC) Verbs Overview' by Renato Recio, Apr. 2001. (Year: 2001).*

(Continued)

*Primary Examiner* — Steven G Snyder
(74) *Attorney, Agent, or Firm* — Edward J. Wixted, III, Esq.; Blanche E. Schiller, Esq.; Heslin Rothenberg Farley & Mesiti P.C.

(57) ABSTRACT

An input/output store instruction is handled. A data processing system includes a system nest communicatively coupled to at least one input/output bus by an input/output bus controller. The data processing system further includes at least a data processing unit including a core, system firmware and an asynchronous core-nest interface. The data processing unit is communicatively coupled to the system nest via an aggregation buffer. The system nest is configured to asynchronously load from and/or store data to an external device which is communicatively coupled to the input/

(Continued)

output bus. The data processing unit is configured to complete the input/output store instruction before an execution of the input/output store instruction in the system nest is completed.

25 Claims, 4 Drawing Sheets

(51) Int. Cl.
  *G06F 9/38* (2018.01)
  *G06F 9/4401* (2018.01)
  *G06F 9/54* (2006.01)
  *G06F 11/07* (2006.01)
(52) U.S. Cl.
  CPC ............ *G06F 9/4411* (2013.01); *G06F 9/451* (2018.02); *G06F 9/544* (2013.01); *G06F 9/546* (2013.01); *G06F 11/0772* (2013.01)

(56) References Cited

U.S. PATENT DOCUMENTS

| | | | |
|---|---|---|---|
| 5,257,386 A | 10/1993 | Saito | |
| 5,317,739 A | 5/1994 | Elko | |
| 5,548,735 A | 8/1996 | Chen | |
| 5,548,788 A | 8/1996 | McGillis | |
| 5,553,302 A | 9/1996 | Morrissey | |
| 5,968,137 A | 10/1999 | Ferraiolo | |
| 6,038,646 A | 3/2000 | Sproull | |
| 6,072,781 A * | 6/2000 | Feeney | G06F 9/544 |
| | | | 709/215 |
| 6,085,277 A * | 7/2000 | Nordstrom | G06F 9/546 |
| | | | 710/263 |
| 6,189,088 B1 | 2/2001 | Gschwind | |
| 6,247,097 B1 | 6/2001 | Sinharoy | |
| 6,286,095 B1 | 9/2001 | Morris et al. | |
| 6,449,714 B1 | 9/2002 | Sinharoy | |
| 6,490,647 B1 | 12/2002 | Batchelor | |
| 6,496,277 B1 | 12/2002 | Chapin | |
| 6,578,102 B1 | 6/2003 | Bachelor | |
| 6,725,348 B1 | 4/2004 | Marier | |
| 7,042,881 B1 | 5/2006 | Dhar | |
| 7,178,019 B2 | 2/2007 | Lam | |
| 7,200,626 B1 | 4/2007 | Hoang et al. | |
| 7,631,097 B2 | 12/2009 | Moch et al. | |
| 7,827,433 B1 | 11/2010 | Hutton | |
| 8,650,335 B2 | 2/2014 | Brice, Jr. et al. | |
| 8,867,344 B2 | 10/2014 | Wang et al. | |
| 9,965,187 B2 * | 5/2018 | Gokhale | G06F 3/0011 |
| 9,971,545 B1 | 5/2018 | Asnaashari | |
| 1,052,278 A1 | 10/2019 | Benisty | |
| 10,496,540 B2 * | 12/2019 | Okawara | G06F 9/48 |
| 11,068,266 B2 | 7/2021 | Raisch | |
| 11,074,203 B2 | 7/2021 | Raisch | |
| 11,163,566 B2 | 11/2021 | Raisch | |
| 11,334,503 B2 * | 5/2022 | Raisch | G06F 9/30087 |
| 2005/0138230 A1 | 6/2005 | Raisch | |
| 2005/0261850 A1 | 11/2005 | Goodman | |
| 2009/0063898 A1 | 3/2009 | Eisen et al. | |
| 2009/0150624 A1 | 6/2009 | Resnick | |
| 2009/0198917 A1 | 8/2009 | Arimilli | |
| 2009/0198963 A1 | 8/2009 | Arimilli | |
| 2010/0014437 A1 | 1/2010 | Wang et al. | |
| 2011/0320643 A1 | 12/2011 | Brice et al. | |
| 2011/0320764 A1 | 12/2011 | Craddock et al. | |
| 2015/0106567 A1 | 4/2015 | Godard | |
| 2015/0261529 A1 | 9/2015 | Gainey | |
| 2015/0261535 A1 | 9/2015 | Snyder | |
| 2015/0293863 A1 | 10/2015 | Still | |
| 2015/0378737 A1 | 12/2015 | Debbage et al. | |
| 2015/0378738 A1 | 12/2015 | Debbage et al. | |
| 2016/0098363 A1 | 4/2016 | Hagspiel | |
| 2018/0137009 A1 | 5/2018 | Higgs et al. | |
| 2018/0341410 A1 | 11/2018 | Benisty | |
| 2019/0108022 A1 | 4/2019 | Lloyd | |
| 2019/0347125 A1 | 11/2019 | Sankaran et al. | |
| 2020/0249943 A1 | 8/2020 | Raisch | |
| 2020/0249944 A1 | 8/2020 | Raisch | |
| 2020/0250112 A1 | 8/2020 | Raisch | |
| 2020/0250115 A1 | 8/2020 | Raisch | |
| 2021/0311738 A1 | 10/2021 | Raisch | |
| 2021/0311891 A1 | 10/2021 | Raisch | |
| 2023/0017802 A1 * | 1/2023 | Abhishek Raja ... | G06F 9/30043 |

FOREIGN PATENT DOCUMENTS

| | | |
|---|---|---|
| JP | H03288934 A | 12/1991 |
| JP | H04195418 A | 7/1992 |
| JP | H07105126 A | 4/1995 |
| JP | 2008262566 A | 10/2008 |
| JP | 2013538378 | 10/2013 |
| JP | 2017532643 A | 11/2017 |
| RU | 2559723 C2 | 8/2015 |
| TW | 446912 B | 7/2001 |
| TW | 457426 B | 10/2001 |
| TW | 201005542 A | 2/2010 |
| TW | 201826122 A | 7/2018 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.
International Search Report for P201809031PCT01 dated May 7, 2020, pp. 1-3.
Raisch, Christoph et al., "Handling an Input/Ontput Store Instruction," U.S. Appl. No. 17/354,302, filed Jun. 22, 2021, pp. 1-38.
Raisch, Christoph et al., "Handling an Input/Ontput Store Instruction," U.S. Appl. No. 17/351,674, filed Jun. 18, 2021, pp. 1-42.
List of IBM Patents or Patent Applications Treated as Related, Oct. 14, 2021, 2 pages.
Examination Report for AU Application No. 2020213829, dated Nov. 25, 2021 (3 pages).
Examination Report for AU Application No. 2020214661, dated Dec. 9, 2021 (3 pages).
Notice of Acceptance for Patent Application, IP Australia Application No. 2020214661, Sep. 7, 2022, pp. 1-3.
Examination Notice, File No. 11 2020 000 146.6, dated Dec. 22, 2022, 9 pages.
Notice of Reasons for Refusal, Application No. JP2021-535244, dated May 12, 2023, pp. 1-2.
Notice of Reasons for Refusal, Application No. JP2021-532167, dated Jul. 4, 2023, pp. 1-8.
Notice of Reasons for Refusal, Application No. JP2021-534351, dated Jul. 6, 2023, pp. 1-2
Notice of Reasons for Refusal, Application No. JP2021-534814, dated Jul. 19, 2023, pp. 1-9.

* cited by examiner

HANDLING AN INPUT/OUTPUT STORE INSTRUCTION

This application is a continuation of U.S. application Ser. No. 16/775,663, filed on Jan. 29, 2020, entitled "HANDLING AN INPUT/OUTPUT STORE INSTRUCTION," which claims priority from European patent application number EP19154733.0, filed Jan. 31, 2019, each of which is hereby incorporated herein by reference in its entirety.

BACKGROUND

One or more aspects of the present invention relate, in general, to data processing systems, and in particular, to handling an input/output store instruction to an external device.

A computing environment may include one or more types of input/output devices, including various types of adapters. One type of adapter is a Peripheral Component Interconnect (PCI) or Peripheral Component Interconnect Express (PCIe) adapter. This adapter includes one or more address spaces used in communicating data between the adapter and the system to which the adapter is attached.

In some systems, a portion of an address space of the central processing unit (CPU) coupled to the adapter is mapped to an address space of the adapter enabling CPU instructions that access storage to directly manipulate the data in the adapter's address space.

Communication with adapters, such as PCI or PCIe adapters, can be facilitated by control instructions specifically designed for communicating data to and from adapters and used for communication.

In the state of the art, a store instruction for storing data in an adapter includes, for instance, obtaining a machine instruction for execution. The machine instruction is defined for computer execution according to a computer architecture. The machine instruction includes, for instance, an opcode field identifying a store to adapter instruction. A first field identifies a first location that includes data to be stored in an adapter. A second field identifies a second location, the contents of which include a function handle identifying the adapter, a designation of an address space within the adapter in which data is to be stored, and an offset within the address space. The machine instruction is executed. The executing includes using the function handle to obtain a function table entry associated with the adapter. A data address of the adapter is obtained using at least one of information in the function table entry and the offset. Data is stored from the first location in a specific location in the address space identified by the designation of the address space. The specific location is identified by the data address of the adapter.

An existing feature in a large multi-processor system is the ability to quiesce all processors within a target zone. Quiesce functions operate to temporarily pause or alter the state of a processor or group of processors to perform, e.g., system updates or backups. In some instances, a quiesce interruption is applicable to only a subset of the system resources. In such instances, the system can be divided into different zones. For a quiesce operation applicable to one zone (a target zone), processors outside of the target zone are permitted to continue running, although new translations may be blocked. Typically, at least one system controller or other mechanism broadcasts the quiesce to all physical processors in the system, handles collecting quiesce state information and indicates to a requesting processor when all processors have started, or are ignoring (filtering) the quiesce request.

A quiesce controller can be communicatively coupled to a processor in a multi-processor system and to a quiesce state machine configured to receive a quiesce request. The computer system is configured to receive a quiesce request at the quiesce controller from a requesting processor, which is one of a plurality of processors in a multi-processor system. A determination is made that the quiesce request is not accepted based on a state of the quiesce state machine. Based on the request not being accepted, a reject message configured to indicate that the quiesce request has been rejected is generated, holding the reject message until a quiesce command is broadcast to the multi-processor system. The quiesce command is based on a different quiesce request, and the reject message is sent to the requesting processor based on the broadcast of the quiesce command being detected by the quiesce controller.

SUMMARY

Shortcomings of the prior art are overcome and additional advantages are provided through the provision of a data processing system for handling an input/output store instruction. The data processing system includes a data processing unit configured to perform a method. The method includes identifying an input/output function by an address specified using the input/output store instruction. The input/output store instruction specifies at least the input/output function with an offset through the address, at least one of data to be transferred and a pointer to data to be transferred, and a length of the data. The input/output store instruction is completed before an execution of the input/output store instruction in a selected component of the data processing system different from the data processing unit is completed. The selected component is configured to asynchronously load from or store data to at least one external device. The data with local completion is forwarded. Notification is provided through an interrupt, based on detecting an error during an asynchronous execution of the input/output store instruction.

Computer-implemented methods and computing program products relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Aspects of the present invention together with objects and advantages may best be understood from the following detailed description of the embodiments, but not restricted to the embodiments, taken in conjunction with the accompanying drawings in which.

DETAILED DESCRIPTION

Figure 1:
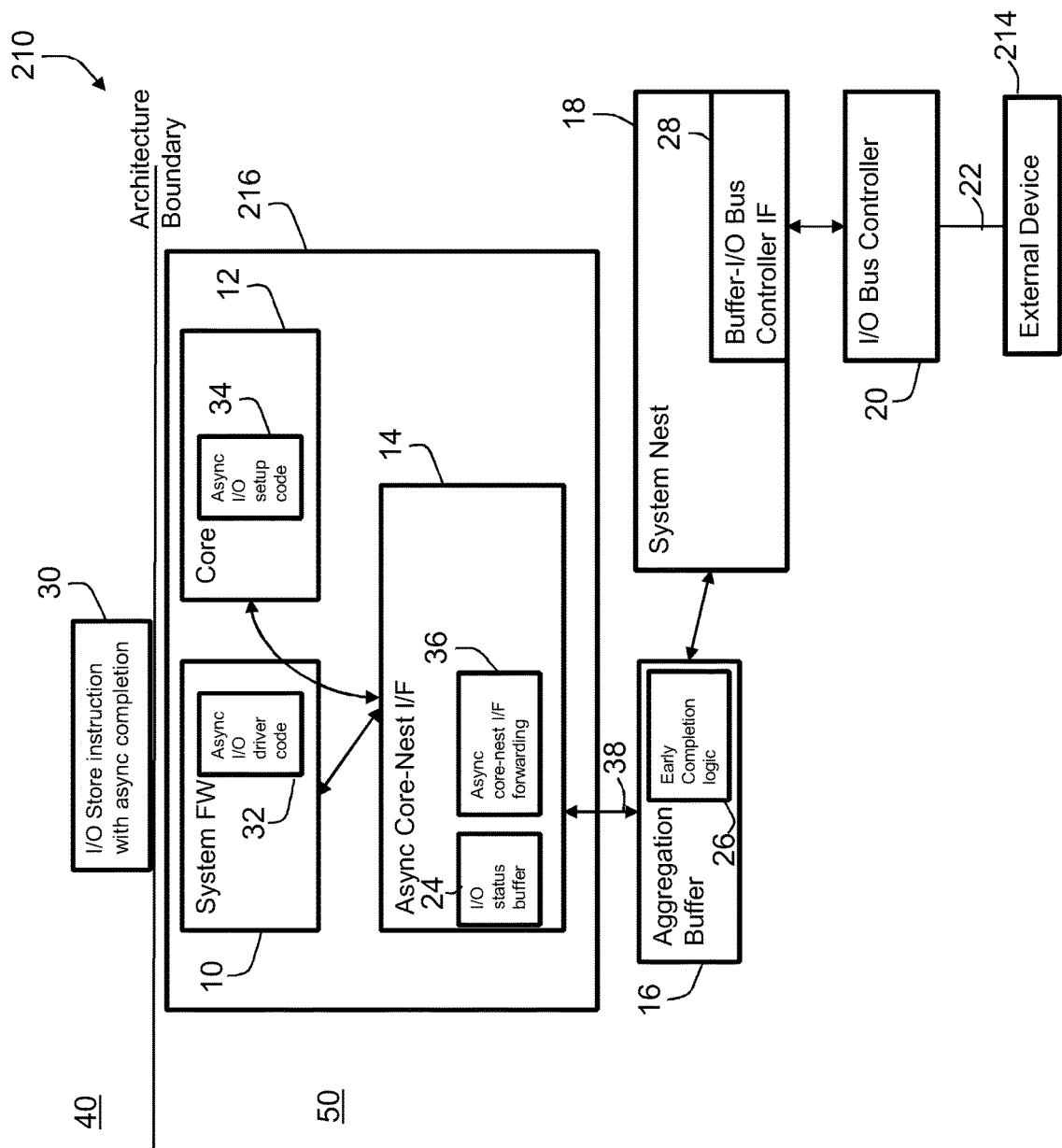
FIG. 1 depicts one example of a block diagram of a data processing system for handling an input/output store instruction to an external device according to an embodiment of the invention.

In the drawings, like elements are referred to with equal reference numerals. The drawings are merely schematic representations, not intended to portray specific parameters of the invention. Moreover, the drawings are intended to depict only typical embodiments of the invention, and therefore, should not be considered as limiting the scope of aspects of the invention.

The illustrative embodiments described herein provide, for instance, a data processing system, a computer program product and a method for handling an input/output store instruction. In one aspect, a data processing system includes a system nest communicatively coupled to at least one input/output bus by an input/output bus controller. The data processing system further includes at least a data processing unit including a core, a system firmware and an asynchronous core-nest interface. The data processing unit is communicatively coupled to the system nest via an aggregation buffer. The system nest is configured to asynchronously load from and/or store data to at least one external device which is communicatively coupled to the input/output bus.

The illustrative embodiments may be used for a method, in which, in one example: an operating system running on the data processing system issues the input/output store instruction specifying at least an input/output function with an offset through an address, data to be transferred and/or a pointer to data to be transferred, and a length of the data; the data processing unit is configured to identify the input/output function by the address specified in the input/output store instruction; the data processing unit is configured to verify if access to the input/output function is allowed on an address space and on a guest instance level, the guest running on the data processing system; the data processing unit is configured to complete the input/output store instruction before an execution of the input/output store instruction in the system nest is completed; and the system firmware is configured to notify the operating system through an interrupt, if during the asynchronous execution of the input/output store instruction an error is detected by the data processing unit, transmitting the data of the failed asynchronous execution.

Alternatively or additionally of data to be transferred, the store instruction according to an embodiment of the invention may also specify a pointer to main memory which is to be used to fetch data from, instead of containing the data directly.

A guest instance level may also mean that a single guest or host may be running on the data processing system.

The address of the offset of the input/output function itself can be a virtual, physical, or logical address. Virtual and logical addresses typically get translated through a memory management unit (MMU) into a physical address, and the physical address then allows to identify which function and offset is meant.

Physical address in this context means, for instance, a "lowest address in the address translation hierarchy accessible from within a guest/operating system."

FIG. 1 depicts one example of a block diagram of a data processing system 210 for handling an input/output (I/O) store instruction 30 to at least one external device 214 according to an embodiment of the invention. The data processing system 210 includes, for instance, a system nest 18 communicatively coupled to an input/output bus 22 by an input/output bus controller 20; and a data processing unit 216 including a core 12, a system firmware 10 and an asynchronous core-nest interface (I/F) 14.

The data processing unit 216 is communicatively coupled to the system nest 18 via an aggregation buffer 16. The system nest 18 is configured to asynchronously load from and/or store data to the external device 214 which is communicatively coupled to the input/output bus 22 via a buffer-input/output bus controller interface 28 as part of the system nest 18 and the input/output bus controller 20.

The aggregation buffer 16 is communicatively coupled to the asynchronous core-nest interface 14. The system firmware 10 includes, for instance, an asynchronous input/output driver code 32 for handling the input/output store instruction 30. The core 12 includes asynchronous setup code 34 for handling memory requirements for status information of the asynchronous input/output driver code 32. The asynchronous core-nest interface 14 includes an asynchronous core-nest interface forwarding component 36 for forwarding the data with local completion. The aggregation buffer 16 includes early completion logic 26 for delivering a free for reuse message after sending a request. The aggregation buffer 16 is coupled to the asynchronous core-nest interface 14 via an asynchronous bus 38. The asynchronous core-nest interface 14 includes, for instance, an input/output status buffer 24. The input/output status buffer 24 collects returned states from the system nest 18 and/or from the input/output bus controller 20, in particular a completion message from the system nest 18. The input/output status buffer 24 is, in one example, integrated directly in the asynchronous core-nest interface 14.

According to an embodiment of the method, an operating system running on the data processing system 210 issues the input/output store instruction 30 specifying at least an input/output function with an offset through an address, data to be transferred and/or a pointer to data to be transferred, and a length of the data. The data processing unit 216 is hereby configured to identify the input/output function by the address specified in the input/output store instruction 30. The data processing unit 216 is configured to verify if access to the input/output function is allowed on an address space and on a guest instance level, the guest running on the data processing system 210. The data processing unit 216 is configured to complete the input/output store instruction 30 before an execution of the input/output store instruction 30 in the system nest 18 is completed. The system firmware 10 is configured to notify the operating system through an interrupt, if during the asynchronous execution of the input/output store instruction 30 an error is detected by the data processing unit 216, transmitting the data of the failed asynchronous execution.

The input/output store instruction 30 is located, for instance, in the data processing system 210 on the side of the user interface 40 across the architecture boundary which separates the system hardware/firmware 50 from the user side 40.

Thus, the data is transferred by the input/output store instruction 30 through an asynchronous transmit mechanism with an early completion message in multiple data packets to the aggregation buffer 16, if the length of the source data exceeds a defined length, e.g., eight bytes, else the data is transferred in one data packet.

A system message according to an embodiment of the data processing system includes, for instance, one of a hierarchical physical target address, sourcing an SMT (simultaneous multithreading) thread or an aggregate buffer identifier, a length of data, an input/output bus address, or a sequence number for a recovery algorithm.

Figure 2:
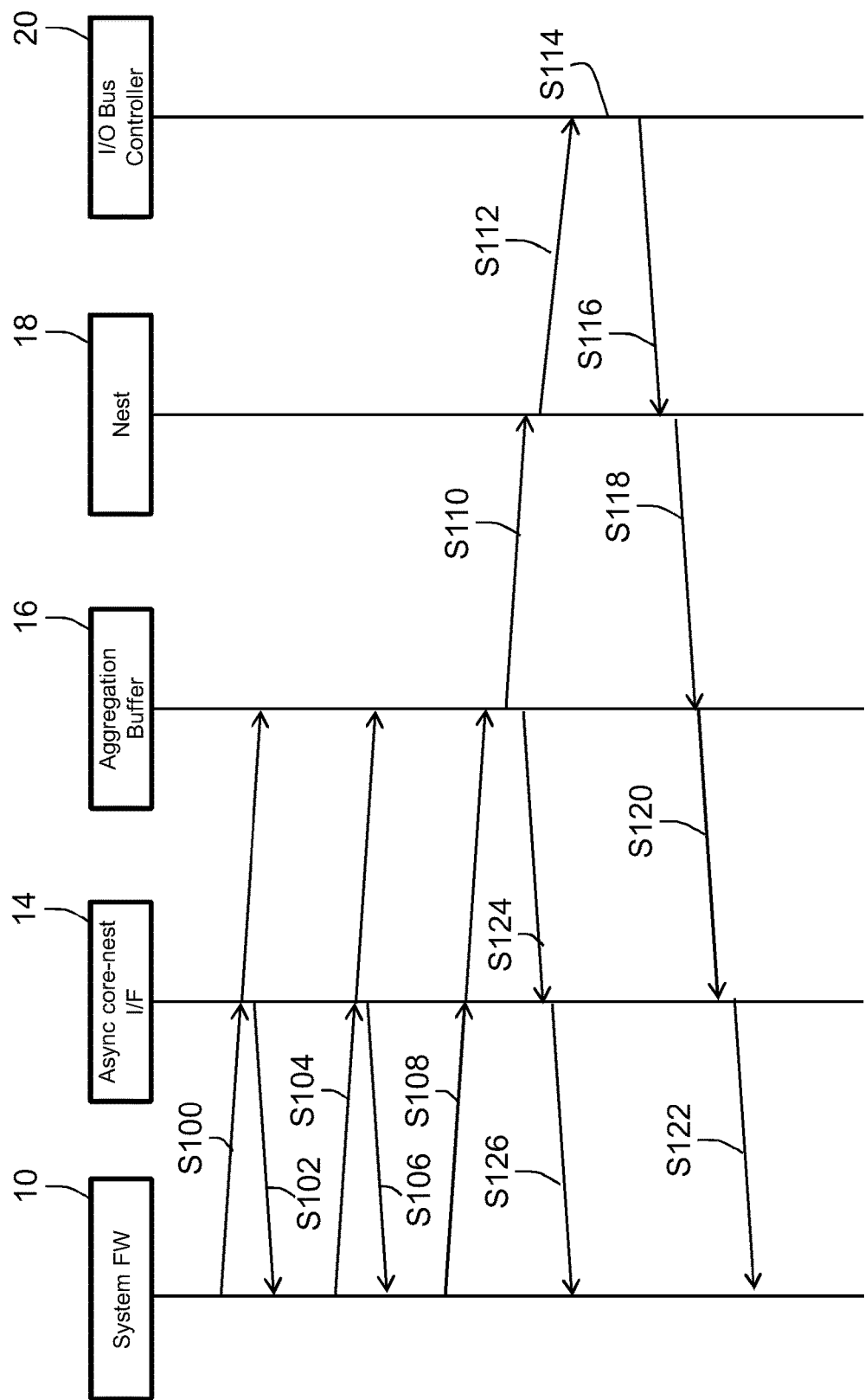
FIG. 2 depicts one example of a message sequence chart of a method for handling an input/output store instruction to an external device according to an embodiment of the invention.

FIG. 2 depicts one example of a message sequence chart of one or more aspects of a method for handling an input/output store instruction 30 to an external device 214 according to an embodiment of the invention.

In one example, the method starts with the operating system issuing an input/output store instruction 30. Next, as is indicated by the steps S100 and S104 of FIG. 2, the system firmware 10 issues repeatedly, if a length of the data exceeds a defined length, e.g., eight bytes, a system message to send a data packet to the aggregation buffer 16 until the data (e.g., all the data) of a store block has been forwarded to the aggregation buffer 16, while the system firmware 10 is waiting until the data has been sent by the system message. In steps S102 and S106 a local completion message is sent back to the system firmware 10.

In step S108, the system firmware 10 issues a system message to the aggregation buffer 16 to forward the data asynchronously as a single nest message to the input/output bus controller 20, while waiting for the aggregation buffer 16 to send a completion message.

In step S110, the aggregation buffer 16 injects the nest message into the system nest 18, wherein in step S124 the aggregation buffer 16 is free for reuse right after the send operation, signaling back to the system firmware 10 in step S126. Then, the aggregation buffer 16 sends a free for reuse message.

In step S112, the system nest 18 forwards the message to the target location, followed by step S114, the input/output bus controller 20 receiving the message and forwarding data in a data frame to the input/output bus, followed by the input/output bus controller 20 sending a completion message to the system nest 18 in step S116.

In step S118, the system nest 18 forwards the completion message to the originating aggregation buffer 16, followed by the aggregation buffer 16 forwarding completion to the asynchronous core-nest interface 14 in step S120. Then, in step S122 the asynchronous core-nest interface 14 signals completion of the operation to the system firmware 10.

In case of an error occurring during transfer of data, the system firmware 10 signals asynchronously defects to the operating system.

In case the data to be transferred is less than the defined length, e.g., eight bytes, the repeatedly filling of the aggregation buffer 16 is skipped.

Figure 3:
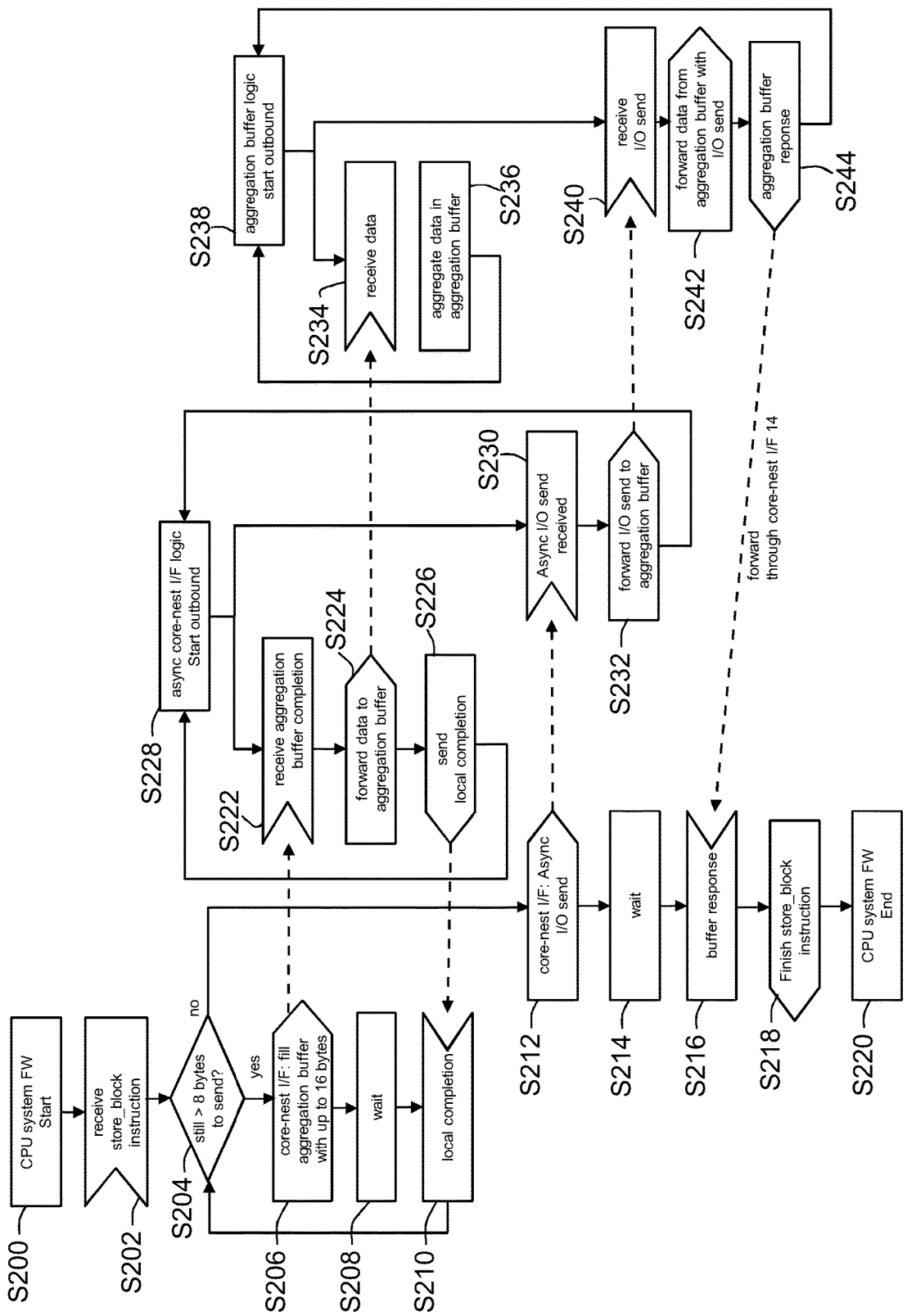
FIG. 3 depicts one example of a flow chart for handling an input/output store instruction to an external device according to an embodiment of an embodiment of the invention.

FIG. 3 depicts one example of a flow chart for handling an input/output store instruction 30 to an external device 214 according to an embodiment of the invention.

In one embodiment, the system firmware of the data processing unit starts in step S200. In step S202, the system firmware receives an input/output store block instruction.

In step S204, it is checked if the more than a defined length, e.g., 8 bytes, is to be transferred. If this is the case, the core-nest interface fills the aggregation buffer with an up to, e.g., 16 bytes message in step S206. The system firmware is waiting, step S208, until a message of local completion is sent in step S210, returning to step S204. If there are less than, e.g., 8 bytes left in the check of step S204, the flow continues in step S212 with the core-nest interface sending an asynchronous input/output message, followed by waiting in step S214 for a buffer response in step S216. In step S218, a finish store block instruction is executed and the flow ends in step S220 with an ending in the system firmware.

In step S228, the asynchronous core-nest interface logic starts an outbound process loop, followed by receiving an aggregation buffer completion message in step S222 and a forward data message to the aggregation buffer in step S224, followed by a send completion message back to the system firmware in step S226. In step S230, an asynchronous input/output send message is received followed by a forward of the input/output send message to the aggregation buffer in step S232.

In step S238, the aggregation buffer logic starts an outbound process loop followed by a receive data in step S234 and aggregating data in the aggregation buffer in step S236. The aggregation buffer is also receiving an input/output send message in step S240, followed by forwarding data from the aggregation buffer with an input/output send message in step S242. In step S244, a response message from the aggregation buffer is sent via the core-nest interface to the system firmware.

Figure 4:
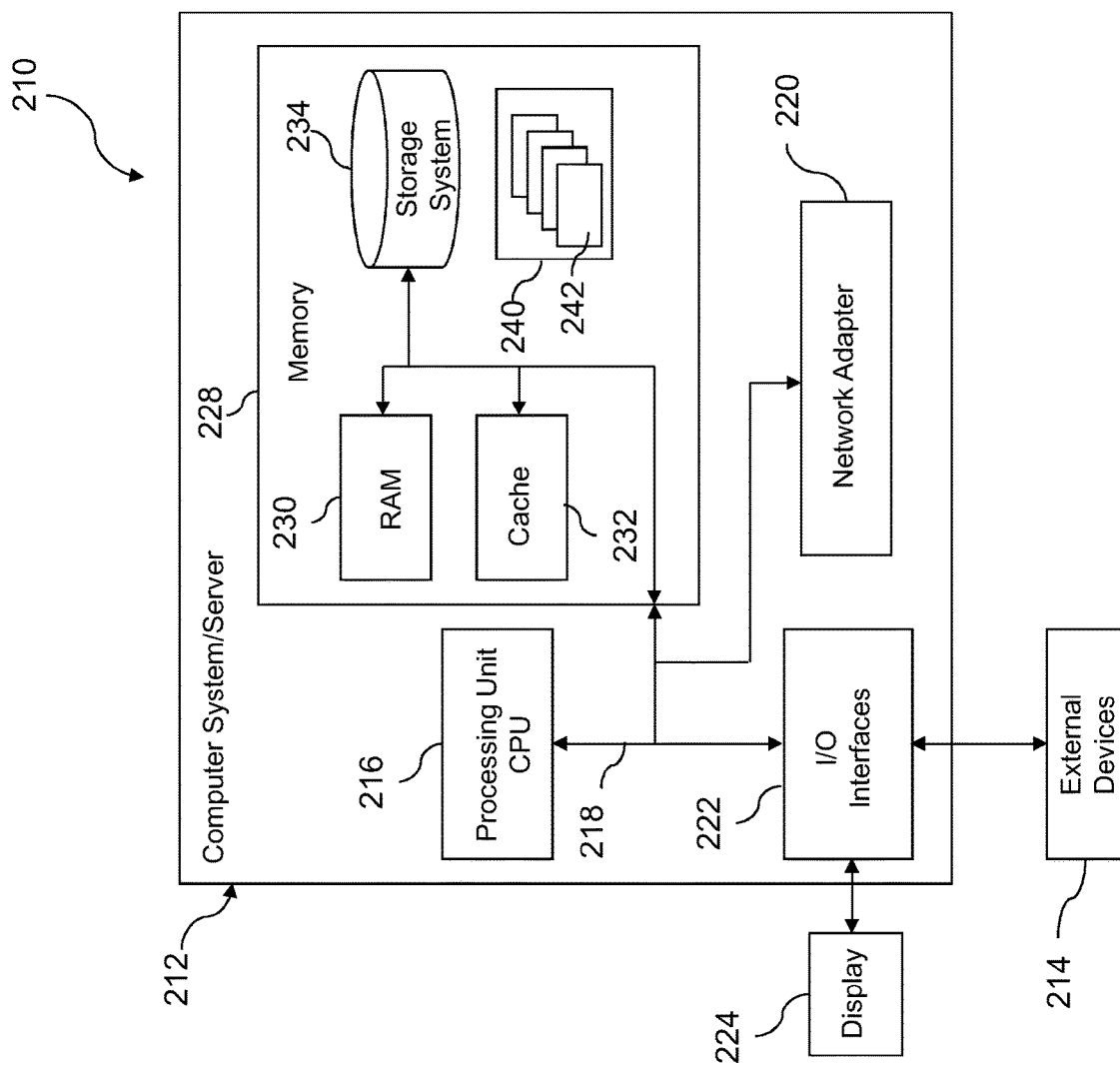
FIG. 4 depicts an example embodiment of a data processing system for executing a method according to an embodiment of the invention.

Referring now to FIG. 4, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210, there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks, such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

In one aspect, a data processing system is provided for handling an input/output store instruction, comprising a system nest communicatively coupled to at least one input/output bus by an input/output bus controller. The data processing system further comprises at least a data processing unit comprising a core, a system firmware and an asynchronous core-nest interface. The data processing unit is communicatively coupled to the system nest via an aggregation buffer. The system nest is configured to asynchronously load from and/or store data to at least one external device which is communicatively coupled to the input/output bus.

The data processing system is configured, in one example, to perform: an operating system running on the data processing system issues the input/output store instruction specifying at least an input/output function with an offset through an address, data to be transferred and/or a pointer to data to be transferred, and a length of the data; the data processing unit is configured to identify the input/output function by the address specified in the input/output store instruction; the data processing unit is configured to verify if access to the input/output function is allowed on an address space and on a guest instance level, the guest running on the data processing system; the data processing unit is configured to complete the input/output store instruction before an execution of the input/output store instruction in the system nest is completed; and the system firmware is configured to notify the operating system through an interrupt, if during the asynchronous execution of the input/output store instruction an error is detected by the data processing unit, transmitting the data of the failed asynchronous execution.

In one embodiment, a number of cycles per instruction may be improved by replacing a synchronous PCI instruction by a reliable asynchronous send instruction and mechanism. A PCI store instruction with asynchronous execution of the PCIe store effect and asynchronous status handling may be performed. Asynchronous reliable execution is based on reliable forwarding mechanisms in a microarchitecture.

The data processing system according to an embodiment of the invention comprises instructions loading from and storing to at least one external device of the data processing system via an input/output bus. Asynchronous instructions complete before data has been stored to the external device while synchronous instructions complete after data has been stored to the external device.

Within the embodiments described herein, PCI is used interchangeably for any other input/output technology, thus not restricting embodiments of the invention to PCI.

Embodiments of the invention describe an input/output store instruction execution in a strictly ordered way as observable from above the architecture boundary while the actual execution may be out-of-order within the hardware of the data processing unit (e.g., CPU).

According to embodiments of the invention, a PCI store instruction may be executed with an asynchronous execution of the PCIe store effect and an asynchronous status handling. Asynchronous reliable execution is based on reliable forwarding mechanisms in a microarchitecture of the data processing system of one or more aspects of the invention.

An existing PCI store and store block instruction is usually synchronous up to the point where the PCI store data has been delivered to the PCIe interface and completion returned to a processing unit.

A PCI standard only requires an asynchronous send command of PCI information, which is typically implemented through a store queue in the processor aggregating data with an asynchronous send-out.

According to embodiments of the invention, an improvement concerning cycles per instruction may be achieved by replacing a synchronous PCI instruction by a reliable asynchronous send process of an input/output store instruction.

Alternatively or additionally of data to be transferred, the store instruction according to an embodiment of the invention may also specify a pointer to a main memory which is to be used to fetch data from, instead of containing the data directly.

A guest instance level may also mean that a single guest or host may be running on the data processing system.

An address of the offset of the input/output function itself can be a virtual, physical, or logical address. Virtual and logical addresses typically get translated through a memory management unit (MMU) into a physical address, and the physical address then allows to identify which function and offset is meant.

Physical address in this context means, in one example, "lowest address in the address translation hierarchy accessible from within a guest/operating system."

According to one embodiment of the data processing system, the aggregation buffer may be communicatively coupled to the asynchronous core-nest interface. Thus, the aggregation buffer can handle data directly sent by the asynchronous core-nest interface consecutively until all data to be transferred to the external device is stored in the aggregation buffer.

According to one embodiment of the data processing system, the data may be transferred by the input/output store instruction through an asynchronous transmit mechanism with an early completion message in multiple data packets to the aggregation buffer, if the length of the source data exceeds a defined length, e.g., eight bytes, else the data may be transferred in one data packet. The asynchronous transmit mechanism enables the sending device to be free for reuse at an earlier state.

According to one embodiment of the data processing system, the system firmware may comprise an asynchronous input/output driver code for handling the input/output store instruction. Thus, an asynchronous transmit mechanism may be used for transferring data from the data processing unit to the external device.

According to one embodiment of the data processing system, the core may comprise asynchronous setup code for handling memory requirements for status information of the asynchronous input/output driver code. This asynchronous setup code may further facilitate the asynchronous transmit mechanism through the aggregation buffer to the system nest and the input/output bus controller.

According to one embodiment of the data processing system, the asynchronous core-nest interface may comprise an asynchronous core-nest interface forwarding component for forwarding the data with local completion. This component may be implemented in hardware in the asynchronous core-nest interface. Thus, an asynchronous transmit mode for sending the data in data packets to the aggregation buffer may be supported.

According to one embodiment of the data processing system, the aggregation buffer may comprise early completion logic for delivering a free for reuse message after sending a request. This enables an early continuation of the transmit process of the data via the aggregation buffer to the system nest and the input/output bus controller.

According to one embodiment of the data processing system, the aggregation buffer may be coupled to the asynchronous core-nest interface via an asynchronous bus. By this way, the asynchronous transmit mechanism for data transfer from the asynchronous core-nest interface may be supported.

According to one embodiment, the data processing system may further comprise an input/output status buffer collecting returned states from the system nest and/or from the input/output bus controller, in particular a completion message from the system nest. This input/output status buffer collects the returned states acting as an asynchronous system message buffer supporting the asynchronous transmit process.

According to one embodiment of the data processing system, the asynchronous core-nest interface may comprise the input/output status buffer. In one example, the input/output status buffer is integrated directly in the asynchronous core-nest interface for quick response.

According to one embodiment of the data processing system, a system message may comprise one of a hierarchical physical target address, sourcing an SMT thread or an aggregate buffer identifier, a length of data, an input/output bus address, or a sequence number for a recovery algorithm. Thus, a passing of relevant information through the data processing system can be guaranteed.

Further, in one aspect, a method is provided for handling an input/output store instruction to at least one external device of a data processing system. The data processing system comprises a system nest communicatively coupled to at least one input/output bus by an input/output bus controller. The data processing system further comprises at least a data processing unit comprising a core, a system firmware and an asynchronous core-nest interface. The data processing unit is communicatively coupled to the system nest via an aggregation buffer. The external device is communicatively coupled to the input/output bus.

In one embodiment, the method comprises: an operating system running on the data processing system issuing the input/output store instruction specifying at least an input/output function with an offset through an address, data to be transferred and/or a pointer to data to be transferred, and a length of the data; the data processing unit being configured to identify the input/output function by the address specified in the input/output store instruction; the data processing unit being configured to verify if access to the input/output function is allowed on an address space and on a guest instance level, the guest running on the data processing system; the data processing unit being configured to complete the input/output store instruction before an execution of the input/output store instruction in the system nest is completed; and the system firmware being configured to notify the operating system through an interrupt, if during the asynchronous execution of the input/output store instruction an error is detected by the data processing unit, transmitting the data of the failed asynchronous execution.

In one embodiment, a number of cycles per instruction may be improved by replacing a synchronous PCI instruction by a reliable asynchronous send instruction and mechanism. A PCI store instruction with asynchronous execution of the PCIe store effect and asynchronous status handling may be performed. Asynchronous reliable execution is based on reliable forwarding mechanisms in a microarchitecture.

The method according to a further embodiment comprises instructions loading from and storing to at least one external device of the data processing system via an input/output bus. Asynchronous instructions complete before data has been stored to the external device while synchronous instructions complete after data has been stored to the external device.

Within the embodiments described herein, PCI is used interchangeably for any other input/output technology, thus not restricting embodiments of the invention to PCI.

Embodiments of the method describe an input/output store instruction execution in a strictly ordered way as observable from above the architecture boundary while the actual execution may be out-of-order within the hardware of the data processing unit (CPU).

According to embodiments of one or more aspects of the method, a PCI store instruction may be executed with an asynchronous execution of the PCIe store effect and an asynchronous status handling. Asynchronous reliable execution is based on reliable forwarding mechanisms in a microarchitecture of the data processing system of one or more aspects of the invention.

An existing PCI store and store block instruction is usually synchronous up to the point where the PCI store data has been delivered to the PCIe interface and completion returned to a processing unit.

A PCI standard only requires an asynchronous send command of PCI information, which is typically implemented through a store queue in the processor aggregating data with an asynchronous send-out.

According to embodiments of the method, an improvement concerning cycles per instruction may be achieved by replacing a synchronous PCI instruction by a reliable asynchronous send process of an input/output store instruction.

Alternatively or additionally of data to be transferred, the store instruction according to an embodiment of the invention may also specify a pointer to a main memory which is to be used to fetch data from, instead of containing the data directly.

A guest instance level may also mean that a single guest or host may be running on the data processing system.

An address of the offset of the input/output function itself can be a virtual, physical, or logical address. Virtual and logical addresses typically get translated through a memory management unit (MMU) into a physical address, and the physical address then allows to identify which function and offset is meant.

Physical address in this context means, in one example, "lowest address in the address translation hierarchy accessible from within a guest/operating system."

According to one embodiment, the method may further comprise: the operating system issuing the input/output store instruction; depending on the length of the data: if a length of the data exceeds a defined length, e.g., eight bytes, the system firmware issuing repeatedly a system message to send a data packet to the aggregation buffer until all data of a store block has been forwarded to the aggregation buffer, while the system firmware waiting until the data has been sent by the system message; else the system firmware issuing a system message to send the data to the aggregation buffer; further independent of the length of the data, the system firmware issuing a system message to the aggregation buffer to forward the data asynchronously as a single nest message to the input/output bus controller, while waiting for the aggregation buffer to send a completion message; the aggregation buffer injecting the nest message into the system nest, wherein the aggregation buffer is free for reuse right after the send operation, signaling back to the system firmware; then the aggregation buffer sending a free for reuse message; the system nest forwarding the message to the target location; the input/output bus controller receiving the message and forwarding data in a data frame to the input/output bus; the input/output bus controller sending a completion message to the system nest; the system nest forwarding the completion message to the originating aggregation buffer; the aggregation buffer forwarding completion to the asynchronous core-nest interface; the asynchronous core-nest interface signaling completion of operation to the system firmware; and the system firmware signaling asynchronously defects to the operating system in case of an error.

In one embodiment, only the step that recites "depending on the length of the data: . . . ; else . . . data to the aggregation buffer;" is dependent on the length of the data and is different for the length of the data exceeding, e.g., eight bytes from the length of the data not exceeding, e.g., eight bytes.

According to one embodiment of the method, the data is transmitted in slices to the aggregation buffer until all data of a store block are forwarded to the aggregation buffer, wherein the system firmware is waiting until the data has been sent by the asynchronous core-nest interface.

Thus, if data is less than, e.g., eight bytes, the filling process of the aggregation buffer in slices with data packets may be skipped and the transmit process of the data to the external device can be completed in a single step.

According to one embodiment of the method, the data may be transferred by the input/output store instruction through an asynchronous transmit mechanism with an early completion message in multiple data packets to the aggregation buffer, if the length of the data exceeds, e.g., eight bytes. The asynchronous transmit mechanism enables the sending device to be free for reuse at an earlier state.

According to one embodiment of the method, the system firmware may use an asynchronous input/output driver code for handling the input/output store instruction. Thus, an asynchronous transmit mechanism may be used for transferring data from the data processing unit to the external device.

According to one embodiment of the method, the core may use an asynchronous setup code for handling memory requirements for status information of the asynchronous input/output driver code. This asynchronous setup code may further facilitate the asynchronous transmit mechanism through the aggregation buffer to the system nest and the input/output bus controller.

According to embodiment of the method, the asynchronous core-nest interface may use an asynchronous core-nest interface forwarding component for forwarding the data with local completion. Thus, an asynchronous transmit mode for sending the data in data packets to the aggregation buffer may be supported.

According to one embodiment of the method, the aggregation buffer may use early completion logic for delivering a free for reuse message after sending a request. This enables an early continuation of the transmit process of the data via the aggregation buffer to the system nest and the input/output bus controller.

According to one embodiment of the method, an input/output status buffer may collect returned states from the system nest and/or from the input/output bus controller, in particular a completion message from the system nest. This input/output status buffer collects the returned states acting as an asynchronous system message buffer supporting the asynchronous transmit process.

According to one embodiment of the method, a system message may comprise one of a hierarchical physical target address, sourcing an SMT thread or an aggregate buffer identifier, a length of data, an input/output bus address, or a sequence number for a recovery algorithm. Thus, a passing of relevant information through the data processing system can be guaranteed.

Further, in one aspect, a computer program product is provided for handling an input/output store instruction to at least one external device of a data processing system, the data processing system comprising a system nest communicatively coupled to at least one input/output bus by an input/output bus controller. The data processing system further comprises at least a data processing unit comprising a core, a system firmware and an asynchronous core-nest interface. The data processing unit is communicatively coupled to the system nest via an aggregation buffer. The external device is communicatively coupled to the input/output bus.

The computer program product comprises a computer readable storage medium having program instructions embodied therewith, the program instructions executable by the computer system to cause the computer system to perform a method comprising: an operating system running on the data processing system issuing the input/output store instruction specifying at least an input/output function with an offset through an address, data to be transferred and/or a pointer to data to be transferred, and a length of the data; the data processing unit being configured to identify the input/output function by the address specified in the input/output store instruction; the data processing unit being configured to verify if access to the input/output function is allowed on an address space and on a guest instance level, the guest running on the data processing system; the data processing unit being configured to complete the input/output store instruction before an execution of the input/output store instruction in the system nest is completed; and the system firmware being configured to notify the operating system through an interrupt, if during the asynchronous execution of the input/output store instruction an error is detected by the data processing unit, transmitting the data of the failed asynchronous execution.

Further, in one aspect, a data processing system for execution of a data processing program is provided, comprising computer readable program instructions for performing the method described above.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data processing system for handling an input/output store instruction, the data processing system comprising:
    a data processing unit configured to perform a method, the method comprising:
        identifying an input/output function by an address specified using the input/output store instruction, the input/output store instruction specifying at least the input/output function with an offset through the address;
        initiating sending a selected amount of data to be transferred to a buffer, wherein the data is indicated using the input/output store instruction;
        obtaining an indication of local completion based on the selected amount of data being sent to the buffer;
        completing the input/output store instruction before an execution of the input/output store instruction in a selected component of the data processing system different from the data processing unit is completed, the selected component configured to asynchronously load from and store data to at least one external device; and
        providing notification through an interrupt, based on detecting an error during an asynchronous execution of the input/output store instruction in the data processing unit.

2. The data processing system of claim 1, wherein the selected component is a system nest communicatively coupled to the data processing unit via an aggregation buffer, the aggregation buffer being the buffer to which to the selected amount of data is being sent.

3. The data processing system of claim 2, wherein the aggregation buffer is communicatively coupled to an asynchronous core-nest interface of the data processing unit.

4. The data processing system of claim 2, wherein the data is transferred by the input/output store instruction through an asynchronous transmit mechanism with an early completion message in multiple data packets to the aggregation buffer, based on a length of the data exceeding a defined size.

5. The data processing system of claim 4, wherein the defined size is eight bytes.

6. The data processing system of claim 4, wherein the data is transferred in one data packet, based on the length of the data not exceeding the defined size.

7. The data processing system of claim 1, wherein the method further comprises collecting returned states from the selected component, the returned states comprising a completion message from the selected component.

8. The data processing system of claim 7, wherein the collecting uses an input/output status buffer of the data processing unit.

9. The data processing system of claim 7, wherein the method further comprises collecting returned states from an input/output bus controller coupled to the selected component.

10. The data processing system of claim 1, wherein the data processing unit comprises an asynchronous core-nest interface, the asynchronous core-nest interface comprising an input/output status buffer to collect returned states from the selected component, the selected component being a system nest communicatively coupled to the data processing unit via an aggregation buffer and to an external device, the aggregation buffer being further communicatively coupled to the asynchronous core-nest interface and being the buffer to which the selected amount of data is being sent.

11. The data processing system of claim 10, wherein the data processing unit further comprises system firmware, the system firmware comprising an asynchronous input/output driver code to handle the input/output store instruction.

12. The data processing system of claim 11, wherein the data processing unit further comprises a core, the core comprising an asynchronous setup code to handle memory requirements for status information of the asynchronous input/output driver code.

13. The data processing system of claim 10, wherein the asynchronous core-nest interface comprises an asynchronous core-nest interface forwarding component to forward the selected amount of data.

14. The data processing system of claim 10, wherein the aggregation buffer comprises an early completion logic to deliver a free for reuse message after sending a request.

15. A computer program product for handling an input/output store instruction, the computer program product comprising:
    at least one computer readable storage medium readable by at least one processing circuit and storing instructions for performing a method comprising:
        identifying an input/output function by an address specified using the input/output store instruction, the input/output store instruction specifying at least the input/output function with an offset through the address;

initiating sending a selected amount of data to be transferred to a buffer, wherein the data is indicated using the input/output store instruction;

obtaining an indication of local completion based on the selected amount of data being sent to the buffer;

completing, by a data processing unit of a data processing system, the input/output store instruction before an execution of the input/output store instruction in a selected component of the data processing system different from the data processing unit is completed, the selected component configured to asynchronously load from and store data to at least one external device; and providing notification through an interrupt, based on detecting an error during an asynchronous execution of the input/output store instruction in the data processing unit.

16. The computer program product of claim 15, wherein the method further comprises collecting returned states from the selected component, the returned states comprising a completion message from the selected component.

17. The computer program product of claim 15, wherein the data processing unit comprises an asynchronous core-nest interface, the asynchronous core-nest interface comprising an input/output status buffer to collect returned states from the selected component, the selected component being a system nest communicatively coupled to the data processing unit via an aggregation buffer and to an external device, the aggregation buffer being further communicatively coupled to the asynchronous core-nest interface and being the buffer to which the selected amount of data is being sent.

18. The computer program product of claim 15, wherein the selected component is a system nest communicatively coupled to the data processing unit via an aggregation buffer, the aggregation buffer being the buffer to which to the selected amount of data is being sent.

19. The computer program product of claim 18, wherein the data is transferred by the input/output store instruction through an asynchronous transmit mechanism with an early completion message in multiple data packets to the aggregation buffer, based on a length of the data exceeding a defined size.

20. A computer-implemented method of handling an input/output store instruction, the computer-implemented method comprising:

identifying an input/output function by an address specified using the input/output store instruction, the input/output store instruction specifying at least the input/output function with an offset through the address;

initiating sending a selected amount of data to be transferred to a buffer, wherein the data is indicated using the input/output store instruction;

obtaining an indication of local completion based on the selected amount of data being sent to the buffer;

completing, by a data processing unit of a data processing system, the input/output store instruction before an execution of the input/output store instruction in a selected component of the data processing system different from the data processing unit is completed, the selected component configured to asynchronously load from and store data to at least one external device; and providing notification through an interrupt, based on detecting an error during an asynchronous execution of the input/output store instruction in the data processing unit.

21. The computer-implemented method of claim 20, further comprising collecting returned states from the selected component, the returned states comprising a completion message from the selected component.

22. The computer-implemented method of claim 20, wherein the data processing unit comprises an asynchronous core-nest interface, the asynchronous core-nest interface comprising an input/output status buffer to collect returned states from the selected component, the selected component being a system nest communicatively coupled to the data processing unit via an aggregation buffer and to an external device, the aggregation buffer being further communicatively coupled to the asynchronous core-nest interface and being the buffer to which the selected amount of data is being sent.

23. The computer-implemented method of claim 22, wherein the aggregation buffer comprises an early completion logic to deliver a free for reuse message after sending a request.

24. The computer-implemented method of claim 20, wherein the selected component is a system nest communicatively coupled to the data processing unit via an aggregation buffer, the aggregation buffer being the buffer to which to the selected amount of data is being sent.

25. The computer-implemented method of claim 24, wherein the data is transferred by the input/output store instruction through an asynchronous transmit mechanism with an early completion message in multiple data packets to the aggregation buffer, based on a length of the data exceeding a defined size.

* * * * *